UNITED STATES PATENT OFFICE.

AARON E. CARPENTER, OF PHILADELPHIA, PENNSYLVANIA, ASSIGNEE, BY MESNE ASSIGNMENTS, OF EDWIN F. HOUGHTON, DECEASED.

IMPROVEMENT IN CONVERTING IRON INTO STEEL.

Specification forming part of Letters Patent No. 128,042, dated June 18, 1872; reissue No. 6,562, dated July 27, 1875; application filed May 19, 1875.

*To all whom it may concern:*

Be it known that EDWIN F. HOUGHTON, formerly of Philadelphia, Pennsylvania, but now deceased, invented certain Improvements in the Manufacture of Iron and Steel, of which the following is a specification:

The object of this invention is a rapid and thorough case-hardening of iron or its conversion into steel, and a further object is the utilization of the waste bone-black accumulated in the process of filtering petroleum oils.

The bone-black which has been used in carrying out the invention is the waste accumulated in the filtering of what is known as "vacuum-oil"—that is, the heavy oil remaining after all the more volatile hydrocarbons have been driven off by distillation *in vacuo*. This waste bone-black, after parting with all the oil which can be drained off, (which leaves the bone-black in the form of a comparatively dry powder with the hydrocarbon within its pores, but not on the surface of the grains,) still retains in its pores a quantity ascertained to be from twenty to forty per cent. of its own weight of oil, which will not percolate through the mass, and cannot be economically removed from the same. The only use to which this waste material has heretofore been applied has been for fertilizing purposes. It has been found, however, that this waste bone-black thus impregnated with hydrocarbon oil will effect the case-hardening of iron or its conversion into steel much more rapidly and thoroughly than ordinary bone-black or other carbonaceous material ordinarily employed for the purpose, and the surface of the metal thus treated is extremely hard, yet tough and malleable, smooth, and free from blisters and from the discolorations common to iron case-hardened by the usual method, and the metal may consequently be worked up into the desired form more easily, cheaply, and to better advantage.

The mode of applying the compound is that usually followed in using ordinary bone-black for the like purpose.

I claim as the invention of the said EDWIN F. HOUGHTON—

1. A composition for case-hardening iron or converting it into steel, consisting of bone-black or other carbonaceous material impregnated with hydrocarbon-oil.

2. As an improvement in the art of case-hardening iron or converting it into steel, applying thereto in the hardening or converting process carbonaceous material impregnated with hydrocarbon-oil, as set forth.

In testimony whereof I have signed my name to this specification in the presence of two subscribing witnesses.

AARON E. CARPENTER.

Witnesses:

HUBERT HOWSON

HARRY SMITH.